Aug. 17, 1926.

G. E. HINTZ

GRAIN GUARD FOR TRACTORS

Filed Nov. 6, 1925

1,596,537

Inventor
George E. Hintz
By
Attorneys

Patented Aug. 17, 1926.

1,596,537

UNITED STATES PATENT OFFICE.

GEORGE E. HINTZ, OF FOND DU LAC, WISCONSIN.

GRAIN GUARD FOR TRACTORS.

Application filed November 6, 1925. Serial No. 67,276.

This invention relates to grain guards for tractors.

In mowing and handling grain with tractors, it has been the experience that the grain approached by the tractor is frequently damaged prior to the mowing, and it thus becomes necessary to set the mower or other farm implement a great distance laterally of the tractor. In other words, it has been impossible for the tractor to get very close to the grain without damaging a material portion thereof.

This invention is designed to overcome the above noted defects, and objects of such invention are to provide a grain guard for tractors which will deflect the grain in front of the tractor and prevent its being damaged by the tractor.

Further objects are to provide a very light and serviceable grain guard which may be attached to a conventional tractor with a minimum of effort and by the use of standard bolts.

An embodiment of the invention is shown in the accompanying drawings, in which:—

Figure 1:
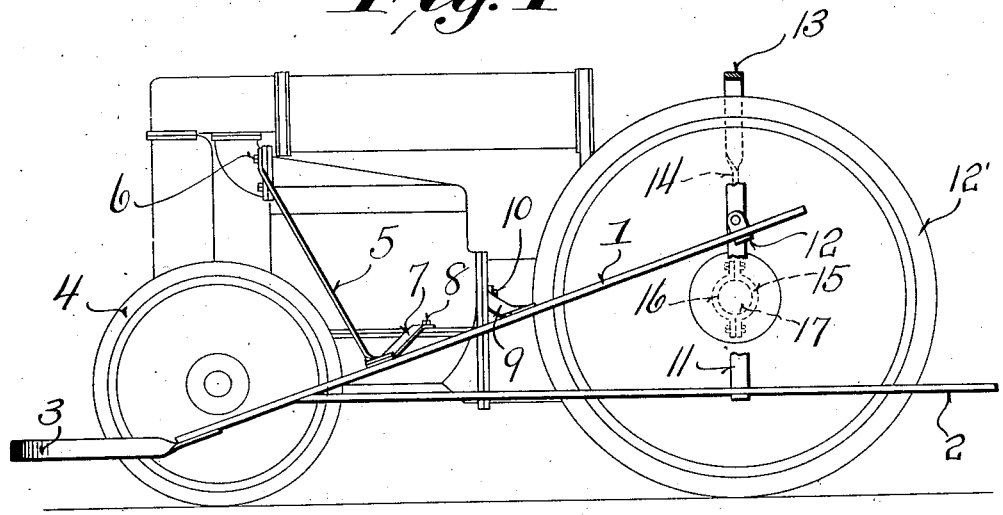
Figure 1 is a side elevation of a tractor equipped with the grain guard with the grain guard partly broken away.
Figure 2:
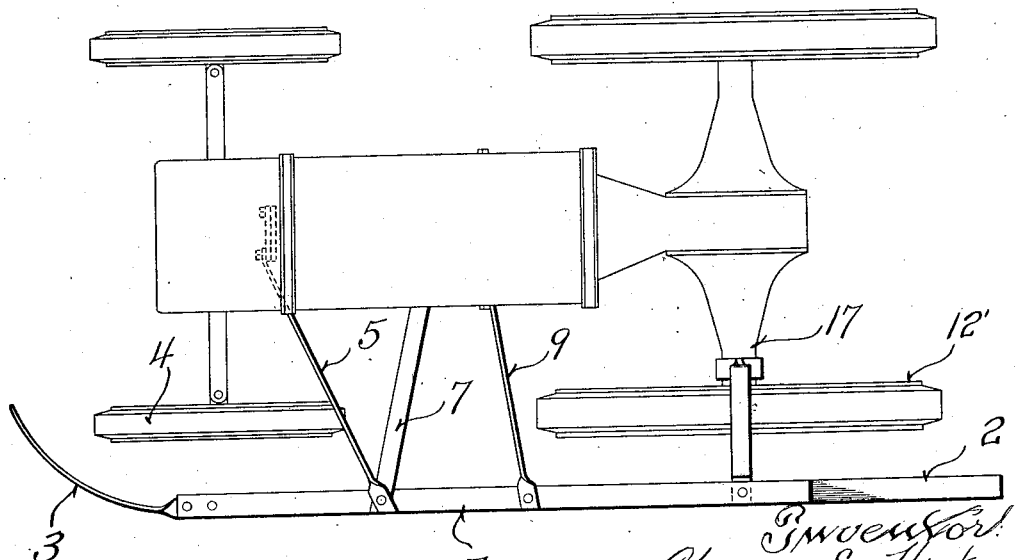
Figure 2 is a plan view of the structure shown in Figure 1.

Referring to the drawings, it will be seen that the grain guard comprises an upwardly and an obliquely extending bar 1 and a horizontally extending bar 2 joined at their front ends. These bars are preferably formed of wood in order to secure lightness. The front end of the bar 1 is provided with a curved forwardly projecting shoe 3 which is positioned in front of the front wheel 4 nearest the grain.

The supporting means for the grain guard comprises a strap 5 of iron which extends upwardly and slantingly and is attached by means of one of the bolts 6 for the radiator fitting of the tractor.

A bar 7 extends inwardly towards the body of the tractor and is attached by means of one of the crank case bolts 8. A further bracing bar 9 also extends inwardly and slightly forwardly and is attached by means of a bolt 10 for the transmission housing.

The rear end of the grain guard is supported by means of a U-shaped member or strap which has a vertical portion 11 located outside of the rear wheel 12'. This portion has its lower end attached to the horizontal bar 2 and is attached to the upwardly and rearwardly slanting upper bar 1 by means of a small bracket member 12. The rear support has a horizontal or curved portion 13 which extends over the wheel and joins the inner downwardly extending portion 14. This downwardly extending portion is twisted, as shown in Figure 1, so that its plane is at 90° to that of the remaining portion of the support. It is bowed outwardly as indicated at 15, and a correspondingly bowed cap member 16 is bolted thereto, as shown in Figure 1, to receive the rear axle housing 17.

In this manner a very secure support for the grain guard is provided and it is to be noted that this support is joined to the front and rear portions of the tractor in a rigid and substantial manner and that intermediate braces are also provided for holding the grain guard outwardly from the tractor.

It will be seen that a very effective type of grain guard has been provided by this invention and that this grain guard will readily deflect the grain and prevent its being damaged by the tractor.

Further, it will be seen that no alterations whatsoever are required for the tractor but that the device may be attached to standard portions of the device.

Although the invention has been described in considerable detail, it is to be understood that the invention may be variously embodied and is, therefore, to be limited only as claimed.

I claim:

A grain guard for a tractor having an engine body, a crank case bolted thereto, a radiator fitting bolted to said engine body, a transmission housing bolted to said engine body and a rear axle housing, said grain guard comprising a pair of side bars adapted to guide the grain at the side of the tractor, one of said bars being approximately horizontal and the other bar slanting upwardly from adjacent the front end of the horizontal bar, braces extending inwardly from said slanting bar and secured to the transmission housing and crank case of the tractor and forming two legs of a triangle, a supporting bar extending upwardly from the slanting bar and secured to the radiator fitting, a U-shaped rear support secured to both of said side bars and extending upwardly and over the rear wheel and secured to the rear axle housing, and a forwardly projecting inwardly curved shoe carried by the forward end of said slanting side bar and positioned in front of the front wheel of the tractor.

In testimony that I claim the foregoing I have hereunto set my hand at Fond du Lac, in the county of Fond du Lac and State of Wisconsin.

GEORGE E. HINTZ.